UNITED STATES PATENT OFFICE.

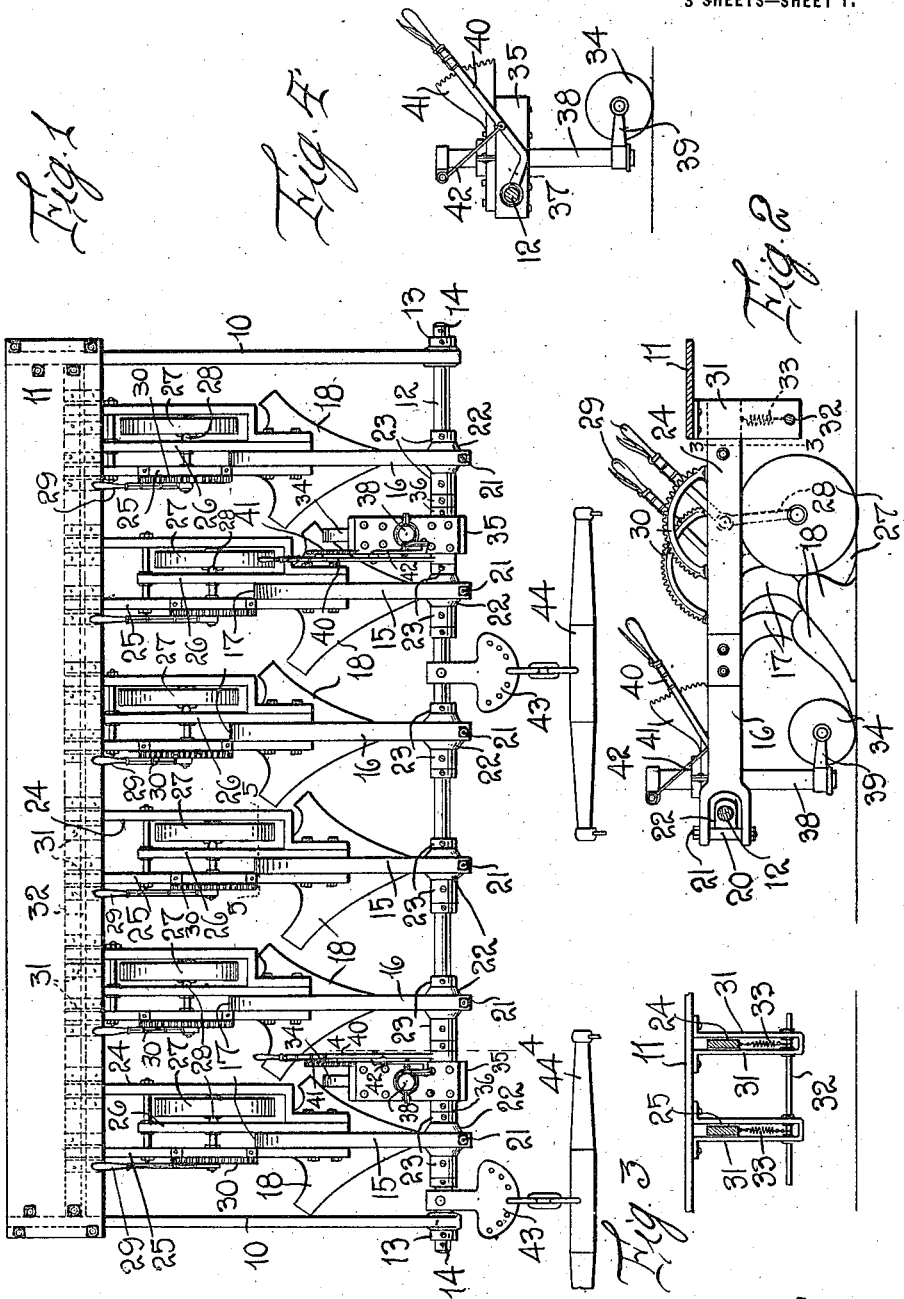

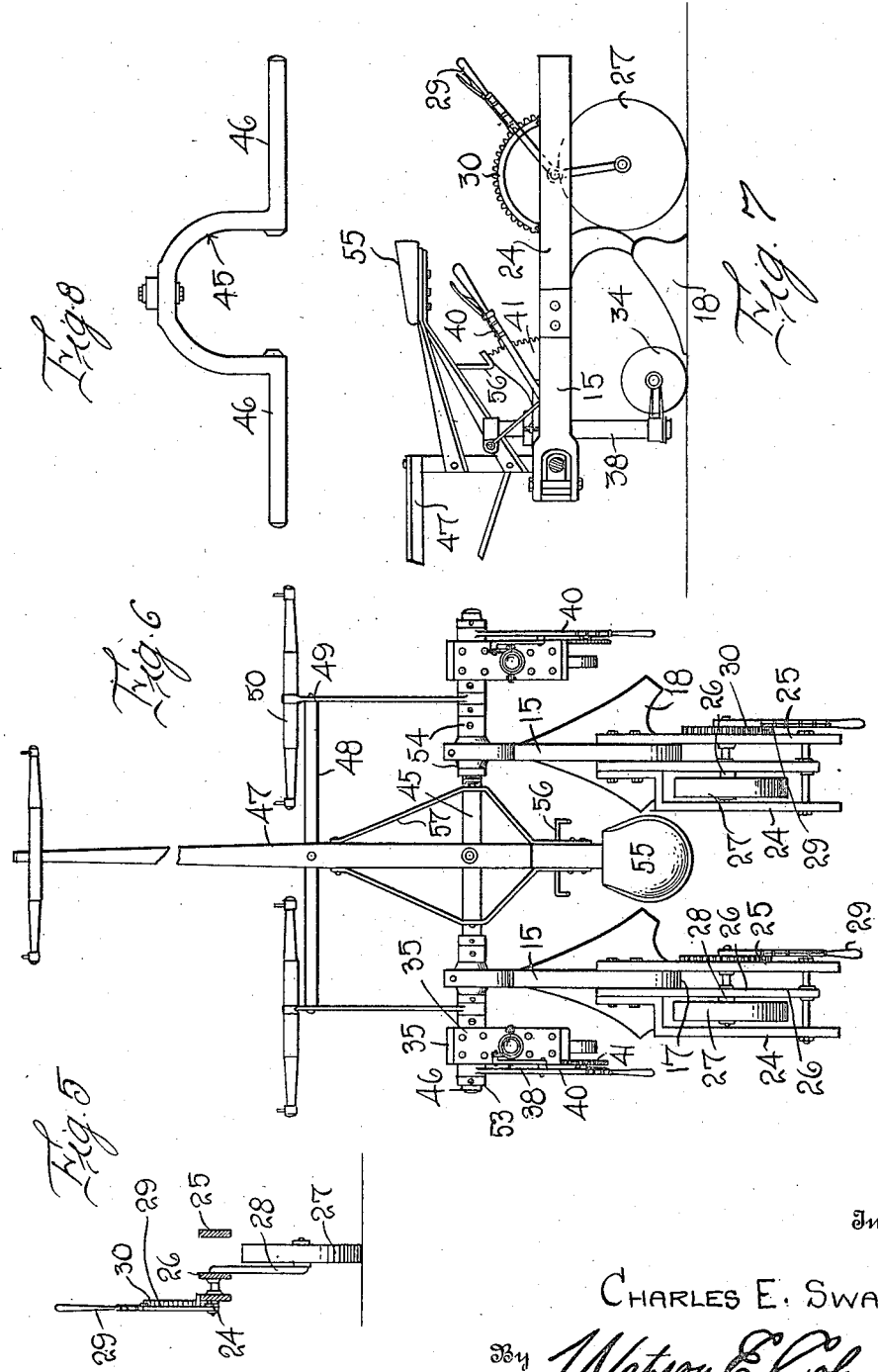

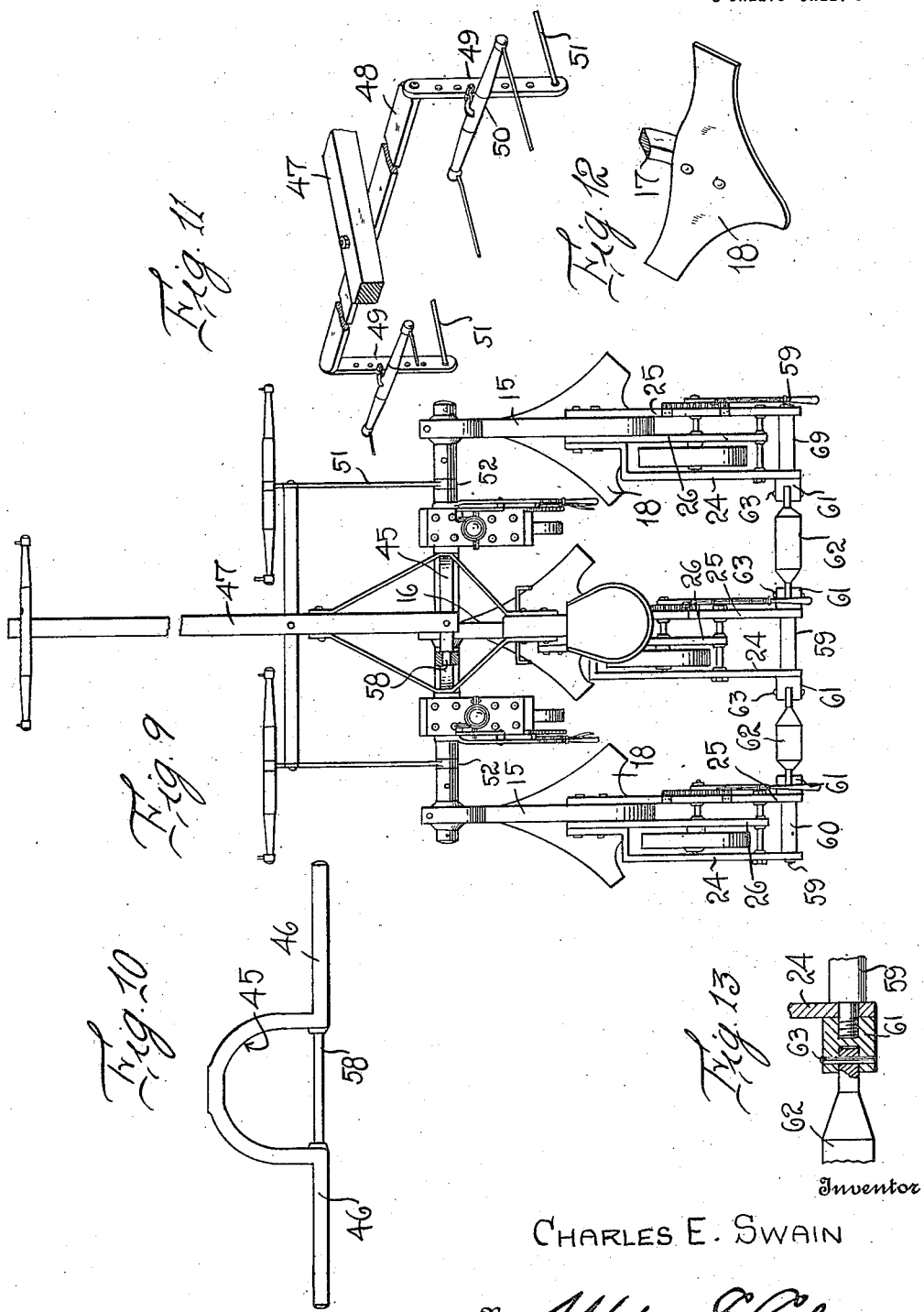

CHARLES E. SWAIN, OF TELSTAD, MONTANA.

WEEDING-MACHINE.

1,269,129.  Specification of Letters Patent.  Patented June 11, 1918.

Application filed October 18, 1916. Serial No. 126,350.

*To all whom it may concern:*

Be it known that I, CHARLES E. SWAIN, a citizen of the United States, residing at Telstad, in the county of Toole and State of Montana, have invented certain new and useful Improvements in Weeding-Machines, of which the following is a specification, reference being had to the accompanying drawings.

This invention relates to agricultural machines, and particularly to machines designed for cutting off the stems of weeds slightly below the ground.

The general object of the invention is to provide a machine which is primarily intended for the purpose of weeding out Russian thistles or for like purpose, but which may be converted into a one row or two row weed cutting machine or into a weed cutting machine for other purposes.

A further object of the invention is to provide a machine of this character having a weed cutting member so formed as to cut slightly below the surface of the ground, and to provide rearward of this weed cutting member or cutter, a wheel traveling upon the surface of the ground and acting to hold the weeds down upon the ground, so that they will not be carried forward with the cutters, but will be left distributed upon the surface of the ground.

A further object is to provide a machine of this character in which a plurality of cutter supporting beams are provided and in which provision is made for so supporting these cutter supporting beams that they may be readily removed from their assembled relation and rearranged in different relations, and in which the several cutter supporting beams may be independently adjusted vertically and may swing both vertically and laterally so as to ride over the ground and follow the irregularities thereof.

A further object is to provide a machine of the character stated including a gang of cutter supporting beams' pivotally mounted upon a forwardly disposed supporting bar or rod for movement in vertical planes, and to provide means whereby the beams may be vertically adjusted individually or whereby all of the beams may be raised or lowered so as to carry the cutters mounted thereon into or out of engagement with the ground.

Still another object is to provide a construction of this character in which any one of the cutter supporting beams may be readily removed or replaced, and to provide an operator supporting platform disposed at the rear ends of the beams and yieldingly supported thereby and so arranged that an operator may pass back and forth upon the platform to adjust the several beams as the conditions of any particular work may require.

Other objects will appear in the course of the following description.

My invention is illustrated in the accompanying drawings, wherein:

Figure 1 is a top plan view of my improved machine as it is arranged for weeding Russian thistles or for work of like character;

Fig. 2 is an end elevation of the machine shown in Fig. 1;

Fig. 3 is a fragmentary section on the line 3—3 of Fig. 2;

Fig. 4 is a fragmentary section on the line 4—4 of Fig. 1;

Fig. 5 is a fragmentary section on the line 5—5 of Fig. 1, the wheel being shown in elevation;

Fig. 6 is a top plan view showing the machine converted into a two row weed cutting machine;

Fig. 7 is a fragmentary side elevation of the machine shown in Fig. 6;

Fig. 8 is an elevation of the arch used with the construction shown in Figs. 6 and 7;

Fig. 9 is a top plan view showing the machine used as a three row cultivator with plank 11 removed;

Fig. 10 is an elevation of the arch 45 with the additional bar 58;

Fig. 11 is a perspective view of the equalizing draft devices for the machine shown in Figs. 6 and 9; and Fig. 12 is a perspective view of one of the weed cutters;

Fig. 13 is a detail view of the members 59, 61 and 62.

Referring to these drawings, and particularly to Figs. 1 to 4, it will be seen that the machine, as arranged for weeding Russian thistles or the like, comprises a supporting frame consisting of the side bars 10 which are preferably made of iron, the transversely extending plank or supporting bar 11 to which the bars 10 are bolted or otherwise rigidly attached, and a transversely extending forward supporting rod 12 which is loosely disposed in openings in the side bars 10 and held in place therein by any suitable means, as by the washers 13 and cotter pins 14. When the cotter pins and washers are removed, the rod 12 may be removed from its engagement with the side bars 10.

Mounted upon the rod 12 for vertical swinging movement are a plurality of beams 15 and 16 designed for the support of weed cutters 18 whose construction will be later described, the beams 15 having the same construction as the beams 16 but being shorter for reasons which will hereafter appear. Each of these beams 15 and 16 at its rear end is downwardly turned as at 17, see Fig. 2, and the foot of the beam is arranged to support the weed cutter 18, this cutter being bolted or attached in any suitable manner to the lower end of the beam. The cutters 18 have the form shown in Fig. 12. The weed cutters are double, that is, provided with a central portion and two laterally projecting wings, and made of plowshare steel and will be about 26 inches wide at the back and somewhat arched at the middle with the outer corners turned upward. These weed cutters in actual practice will be about eight or ten inches deep and twenty-four inches wide and have laterally extending wings so as to cut in opposite directions from the middle and disposed at a slight inclination so as to cut into the soil but a relatively slight amount and cut the stems of the weeds beneath the soil.

Each of the beams 15 and 16 at its forward end is transversely bifurcated or slotted, as illustrated in Fig. 2, and removably disposed within this slot is the vertical sleeve 20 which is pivotally secured to the forward end of the beam by the vertical bolt 21 so that it has pivotal engagement with the forward end of the beam. Extending rearward from this sleeve 20 is an arm or extension 22 through which the rod 12 loosely passes. It will thus be seen that provision is made for vertical movement of the beam around the rod 22 and for a lateral oscillation of the beam upon bolt 21. The members 22, as illustrated in Fig. 1 extend laterally beyond the side faces of the corresponding beams and are engaged by the laterally disposed washers 23 in turn held in place upon the rod 12 by set screws.

Rigidly attached to the rear end of each of the beams 15 and 16 is an extension beam 24 which extends rearward beneath the platform or board 11, and rigidly attached to the other face of the beam 15 is an extension member or beam 25 which extends rearward in spaced relation to the member 24 and extends beneath the platform or board 11. Also rigidly attached to each of the beams 15 and 16 and extending rearwardly therefrom is the beam 26, and disposed between the extensions 25 and 26 are the weed holding wheels 27. Each of these wheels is mounted upon a cranked shaft 28 which in turn is rotatably mounted in the extension beams 24 and 26, and each shaft is provided with a handle lever 29, this handle operating over a sector 30 and having a manually operable latch engaging with the teeth of the sector so that the handle may be held in adjusted positions. It will, of course, be seen that by operating any one of the hand levers 29, the corresponding crank shaft will be rocked and the corresponding beam 15 or 16, as the case may be, will be raised or lowered. At the same time, the wheel 27 will be shifted nearer to or farther from the cutter 18. These wheels 27 are disposed just rearward of the weed cutters 18 so as to roll over any weeds which may be cut and thrown up upon the surface of the ground and hold these weeds upon the surface of the ground preventing the weeds from being carried forward by the cutters. It is to be here noted that the reason for making the beams 15 and 16 of different lengths is so that the cutters 18 on the beams 15 may be disposed behind the cutters 19 on the beams 16, so that the wings of the weed cutters may overlap each other, as illustrated in Fig. 1.

The rear ends of the beam extensions 24 and 25 as before stated, extend beneath the platform or board 11, and attached to the under side of the platform 11 are a plurality of downwardly extending guides 31 as illustrated in Fig. 3. These guides are approximately U-shaped in form having flanges at their upper ends by which they are attached to the platform 11, and extending transversely through the lower ends of all of the guides is a rod 32 which is provided with nuts engaging the guides and acting to brace and firmly support the several guides in spaced relation to each other and in a vertical position. Attached to this rod 31 are a plurality of spring shackles designated generally 33 and illustrated in detail in Fig. 3, there being one of these spring shackles for each guide, these springs being connected to the under faces of the beams 24 and 25 so that the platform 11 will be yieldingly supported, upon the ends of the beams 24 and 25, and so that the weight of the platform transmitted through the springs 33 will urge the beams downward. Normally these springs will support the platform about 3" above the ends of the beams. The springs will act to yieldingly hold the platform in this position but will permit the beams and the platform to vertically oscillate relatively to each other so as to permit the beams to conform more or less to the conformation of the ground and permit the cutters to rise slightly if they strike a stone or other obstruction.

For the purpose of raising or lowering the forward end of the machine and thus with the assistance of the wheels 27 raising the cutters entirely off the ground or lowering them onto the ground, I provide caster or supporting wheels 34. The mounting for these wheels is best shown in Fig. 4. Mounted upon the rod 12 are the members 35 held in place from lateral movement by the collars 36, each of these members having a passage 37 through which extends a post 38, which post at its lower end carries the rearwardly extending arm 39, this arm being rotatable upon the post, and the corresponding wheel 34 is rotatably mounted upon the end of this arm, the arm being bifurcated for this purpose. The post 38 extends upward through the member 35 and is vertically shiftable by means of a lever 40 which is mounted upon the shaft 12. The lever 40 operates over a sector 41 and is operatively engaged with the upper end of the post 38 through the medium of the link 42, and it is obvious that by raising or lowering the lever 40 the wheel 34 may be raised or depressed, these wheels constituting caster wheels and also constituting elevating wheels whereby the front of the machine may be elevated or depressed but whereby, in connection with the wheels 37, the whole machine may be raised or lowered relative to the ground.

The operation of my invention as arranged in Fig. 1 is obvious. The machine is drawn over the ground and the operator moving back and forth upon the platform 11 shifts the levers 29 in such manner as to bring the cutters into proper position for operation or to conform to the irregularities of the ground. Of course, inasmuch as the beams are pivoted, each independently of the other, and inasmuch as there is a yielding connection between the beams and the platform, the beams will themselves conform to minor irregularities. The wheels 27 are disposed behind their respective cutters and these wheels roll upon and hold thistles or other weeds as they are cut out by the cutters so as to prevent the weeds from being carried along and gather in front of the respective cutters. The cutters are designed when weeding to make a shallow cut beneath the surface of the ground so as to cut the weeds out of the ground. When the end of the field is reached, the operator depresses the levers 40 so as to raise the forward portion of the machine, and he depresses the levers 29 so as to depress the wheels 27 to their full extent and then the machine may be turned around in the field with the cutters relatively raised and then the operation is carried forward as before described.

As before stated, it is one of the objects of this invention to provide a convertible machine which may be changed from a weed cutting machine having a gang of weed cutter supporting beams to a machine adapted for work on each side of a single row. This adaptation of the invention is illustrated in Fig. 6 and in this case the conversion of the machine is secured by the use of an arched frame designated 45. This supporting member has an arched middle portion and laterally projecting portions 46. To the arched middle portion there is attached a tongue 47 in the usual manner of machines of this type, and pivoted to this tongue is a transverse bar 48, see Fig. 11, to which are linked the downwardly extending evener bars 49 to which the swingle trees 50 are connected in the usual manner, the lower ends of these evener bars 49 being connected by rods 51 to clips 52 which surround the laterally projecting portions 46 of the arch 45. Two of the beams 15 are used which are mounted upon the laterally projecting portions 46 of the arch in exactly the same manner as they are mounted upon the rod 12, the arch in this case being the equivalent of the rod 12. These beams 15 support the cutting members 18 and of course have attached to them the auxiliary or extension beams 24, 25 and 26 carrying the crank axles 28, the wheel 27 and an operating lever 29, all as before described.

The members 35 are also disposed upon the lateral extensions 46 of the arch 45 outward of the beams 15, these members 35 being held in place upon the extension 46 by means of the collars 53 and the cultivator beams themselves being held in place upon the extensions 46 by means of the collars 54. The rear end of the tongue 47 carries upon it a seat 55 and the foot rests 56 and braces 57 which are connected to the arch 45.

I have thus provided a one-row weed cutting machine in which the beams may be independently vertically adjusted and in which the depth of cut may be regulated by adjusting the levers 29 and 40. In this case, too, the wheels 27 act to hold down the weeds, trash, etc., which are cut and turned up by the cutters. It will be seen that in this type of machine the beams may be regulated both by raising or lowering the forward wheels and by raising or lowering the wheels immediately supporting the cutter supporting beams. Where there is no trash, weeds, thistles, etc., to clog the cutters, the wheels 27 can be entirely raised to the sides of the beams so as to leave the beams entirely free and without support. In this last named case, the cutters are used for breaking up the surface of the ground.

In Fig. 9 I illustrate another adaptation of my invention in which the arch 45 is used and all the parts as illustrated in Fig. 6, but in which an additional beam 16 is used which is operatively connected in the manner heretofore described to a bar 58 which is bolted or otherwise attached between the legs of the arch. The beam 15 is attached to this bar 58 in precisely the same manner as the beams 15 are attached to the extensions 46 of the arch and as each of these beams 15 and 16 is attached to the transverse supporting rod or bar 12. These several beams are held in place upon the several bars by means of washers and set screws as heretofore described and they have a vertical oscillation and a lateral oscillation and are adjusted by depressing or elevating the respective wheels 27. Where three beams are attached to the arch 45 the members 35 are disposed between the arch and the outer beams 15 instead of being disposed upon the extremities of the extensions 46. In this adaptation of the invention the rear end of the beams are preferably flexibly connected. To this end I connect the beam extensions 24 and 25 by means of the bolts 59 passing through sleeves 60. The bolts 59 for the beams 15 are each provided with a bifurcated head 61, the bolt 59 for the beam 16 being provided with a double head, and disposed between these heads are the linking members 62 which are pivoted to the heads by means of pins 63 so that the several beams will have a certain amount of free play and yet will be held in proper spaced relation. This adaptation of my invention provides for a weeding machine for use in small patches of ground. This style of machine is also particularly adapted for use on rough plowed lands.

While I have illustrated only a few of the details of a machine of this character, it will be understood that the machine may be constructed in any desired way as a properly formed channel and angle irons in order to secure the requisite strength and rigidity, that the axles of the several wheels are to be provided with oil cups or other means for securing proper lubrication and that the mechanism may be modified in many ways without departing from the spirit of the invention.

As before stated, this machine is particularly intended for weeding Russian thistles or like relatively large weeds. Russian thistles are relatively tall weeds and have a spread from two to four feet and the thistles have many small branches and thorns, so that in weeding these Russian thistles by means of a machine, the thistles become clogged under the beams and matted against the cutters.

It is to be noted that the wheels 27 act to force Russian thistles and other weeds down onto the ground so that the weeds are not dragged along the row and scattered all over the field to make new growth. This is particularly valuable where the machine is used for the purpose of destroying quack grass, Bermuda grass, running vines, and Canada thistles or like growth. The running vines are cut by the cutters 18 and torn away and thrown up so that the roots of the grasses are turned upward on the top of the ground where they very soon die, the wheels 18 acting to hold the long grasses against the ground so as to prevent their being carried forward and distributed over the field by gathering in front of the cutters. Attention is also called to the fact that the rear ends of the beams in Fig. 1, and indeed in all of the figures, can swing laterally by reason of the swiveled connection of the beams with the supporting rod or bar 12 so that the beams 15 and 16 may conform to the inequalities of the surface over which the machine is operating.

While this machine is particularly intended for the purpose of cutting out such weeds as Canada thistles, quack grass and the like, in which case the wheels 18 perform the very vital function of holding the weeds upon the surface of the ground, and preventing them being carried forward by the cutters, yet I do not wish to be limited to the use of relatively shallow double winged cutting members such as 18, as other forms of cutting members may be used, and it will be obvious further that the machine might be used with cultivator shovels disposed in place of the cutters 18 where it is designed to cultivate the soil without cutting out any weeds.

Having described the invention, what I claim is:

1. A machine of the character described including a transversely extending bar, a plurality of cutter supporting beams pivotally mounted upon the bar for free vertical and lateral oscillation, caster wheels supported upon the bar for vertical adjustment, a cutting member mounted upon each of said beams, and weed holding wheels mounted upon each beam and disposed behind each of said cutting members and each vertically adjustable with relation to the beam upon which it is mounted.

2. A weeder including a transversely extending supporting bar, a plurality of caster wheels mounted upon said bar, a plurality of rearwardly extending beams operatively mounted upon the bar for free vertical movement and lateral oscillation, side bars extending from the first named front bar, a transverse platform connecting said side bars, vertically depending guides on the platform with which the beams are operatively engaged for vertical movement, and means yieldingly supporting the platform upon the ends of the beams.

3. A weeder including a transversely extending supporting bar, a plurality of caster wheels mounted upon said bar, a plurality of rearwardly extending beams operatively mounted upon the bar for free vertical movement and lateral oscillation, side bars extending from the first named front bar, a transverse platform connecting said side bars, vertically depending guides on the platform with which the beams are operatively engaged for vertical movement, and springs operatively connected to said guides and beams and resiliently supporting the platform and resisting the upward movement of the beams.

4. A machine of the character described including a transversely extending supporting bar, a plurality of supporting wheels mounted upon the bar, a plurality of rearwardly extending beams operatively mounted upon the bar for free vertical movement and lateral oscillation, cutting members mounted upon the beams, side bars pivoted to and extending rearwardly from the front bar, a transverse platform connecting said side bars, vertically adjustable wheels mounted upon the rear ends of said beams, levers for each of said beams operatively connected to the last named wheels, whereby said wheels may be vertically adjusted independently of each other to thereby adjust the depth of cut of the cutting members, and yielding means supporting the platform upon the rear ends of the beams.

5. In a machine of the character described, a transversely extending forwardly disposed bar, draft appliances connected to said bar, a plurality of beams extending rearwardly from the bar and bifurcated at their forward ends to engage over the bar, bolts passing vertically through the bifurcated ends of the beams, sleeves surrounding the bolts and having rearwardly extending lugs through which the bar loosely passes whereby the beams may be shifted toward or from each other on the bar, the sleeves and connected beams being rotatable in a vertical plane on the bar, collars slidably engaging the bar and disposed on each side of the lugs to thereby hold the lugs detachable on the bar and in adjusted positions, the collars permitting rotation of the sleeves on the bar, caster wheel supporting members through which the bar loosely passes, caster wheels carried by said members, means for vertically adjusting the caster wheels, collars detachably engaging the bar and disposed on each side of the caster wheel supporting members to hold them in adjusted positions, earth working implements mounted upon the beams, and means for vertically adjusting the rear ends of the beams independently of each other.

6. In an implement of the character described, a transversely extending forwardly disposed bar having draft connections, a beam extending rearwardly from the bar and operatively connected thereto for free lateral oscillation and for movement in a vertical plane, an earth working implement carried by the beam, a plurality of extension bars attached to the beam and extending rearwardly therefrom, a cranked axle passing through the extension bars, a caster wheel mounted upon the cranked axle between two of said bars, a lever operatively connected to the cranked axle, and a rack over which said lever moves mounted upon one of said extension bars.

7. In a machine of the character described, a supporting frame, a beam pivotally mounted at its forward end upon said supporting frame for vertical movement, an earth working and weed cutting implement mounted upon the beam having a middle portion and laterally disposed oppositely projecting wings, the middle portion of the implement being relatively low and the wings extending out therefrom being relatively flat, and a freely rotatable weed holding wheel mounted upon the beam rearward of one of said wings and adapted to hold the weeds upon the ground during the severing action of the cutter.

In testimony whereof I hereunto affix my signature in the presence of two witnesses.

CHARLES E. SWAIN.

Witnesses:
L. H. KNUTSON,
ROBT. PAXTON.

Copies of this patent may be obtained for five cents each, by addressing the "Commissioner of Patents, Washington, D. C."